United States Patent
Hallberg

(10) Patent No.: US 6,563,964 B1
(45) Date of Patent: May 13, 2003

(54) IMAGE DOWNSAMPLING USING REDUNDANT PIXEL REMOVAL

(75) Inventor: Bryan Severt Hallberg, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/246,265

(22) Filed: Feb. 8, 1999

(51) Int. Cl.[7] .............................. G06K 9/32; G06K 9/42; H04N 1/393

(52) U.S. Cl. ................ 382/299; 382/298; 382/260; 382/257; 358/451

(58) Field of Search ................. 382/299, 298, 382/293, 282, 243, 260, 263, 264, 266, 269, 275, 255, 256, 257, 274; 358/451; 348/576, 580

(56) References Cited

U.S. PATENT DOCUMENTS

| | | | |
|---|---|---|---|
| 4,394,693 A | 7/1983 | Shirley | 358/283 |
| 4,686,580 A | 8/1987 | Kato et al. | 358/77 |
| 5,113,455 A | 5/1992 | Scott | 382/44 |
| 5,196,934 A | 3/1993 | Fleischman et al. | 358/22 |
| 5,335,295 A | 8/1994 | Ferracini et al. | 358/451 |
| 5,537,130 A | 7/1996 | Morito | 345/127 |
| 5,537,495 A * | 7/1996 | Overton | 382/269 |
| 5,706,369 A * | 1/1998 | Wang et al. | 382/299 |
| 5,905,820 A * | 5/1999 | Cushman et al. | 382/299 |
| 6,026,192 A * | 2/2000 | Maeda | 382/232 |

FOREIGN PATENT DOCUMENTS

| | | |
|---|---|---|
| EP | 0 570 083 A2 | 11/1993 |
| EP | 0 649 245 A1 | 4/1995 |

OTHER PUBLICATIONS

O'Gorman, Lawrence and Hobby, John; *Adaptive and Outline–Based Subsampling of Images Containing Tex and Binary Graphics;* 1996; pp. 1–16.

* cited by examiner

*Primary Examiner*—Bhavesh Mehta
*Assistant Examiner*—Yosef Kassa
(74) *Attorney, Agent, or Firm*—Marger Johnson & McCollom, P.C.

(57) ABSTRACT

A method and apparatus for digital image downsampling are disclosed with particular application to computer-graphics imagery. The digital image is downsampled non-uniformly in a manner that attempts to minimize aliasing of high-spatial-frequency image information by concentrating deletion paths in lower-spatial-frequency image regions. A spatial frequency estimator compares groups of pixels in order to produce a classification of the image. A path generator and path scorer trace and score potential deletion paths through the image, and the path with the greatest score (i.e., one that provides minimal distortion and aliasing) is selected for pixel removal. A recursor repeats this process until a desired number of image rows and/or columns have been removed.

15 Claims, 16 Drawing Sheets

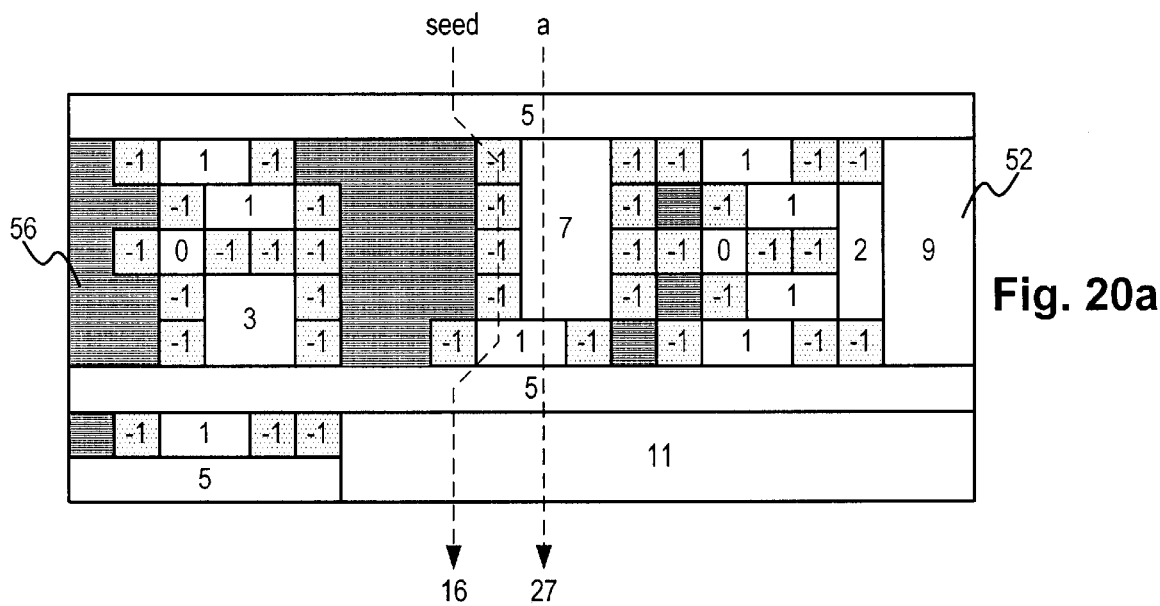
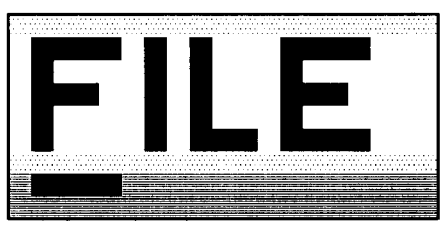
Fig. 20a
Fig. 20b
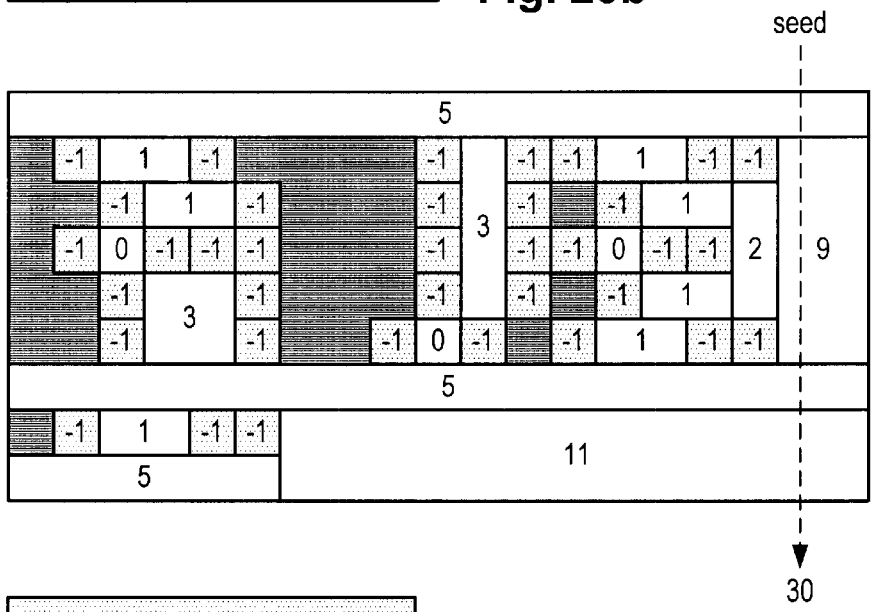
Fig. 21a
Fig. 21b

IMAGE DOWNSAMPLING USING REDUNDANT PIXEL REMOVAL

FIELD OF THE INVENTION

This invention pertains generally to digital image processing, and more particularly to a digital image downsampling method and apparatus.

BACKGROUND OF THE INVENTION

Digital images represent an input scene as a collection of pixel values, typically laid out in a grid of rows and columns. Each pixel value in the image grid represents the greyshade or color of the image sampled at that location, with a variety of pixel formats possible.

Variations in intensity across an image can be described in terms of their spatial frequency, a measure of how quickly intensity variations occur as one traverses an image. The bar graph of FIG. 1 shows a hypothetical example of pixel intensity values for one row of an image. The predominant variation in intensity from column 0 to column 17 is a low frequency variation of about one cycle every 15 pixels. From column 18 to column 38, the predominant variation is much higher, about one cycle in every four pixels. Finally, columns 39 through 44 show spatial frequencies near one cycle every two pixels, the highest possible spatial frequency that can be represented on the digitally-sampled image. A 0.5 cycles/pixel spatial frequency is most often observed in computer-generated graphics with sharp edges, such as text.

Digital image display devices come in a variety of spatial resolutions. For instance, a super video graphics array (SVGA) display format on a personal computer uses a grid 800 pixels wide by 600 pixels high. And an extended graphics array (XGA) display format uses a grid 1024 pixels wide by 768 pixels high.

When an image created at one spatial resolution must be displayed on a device of a lower resolution, the image may be too large for the low-resolution device. In such a case, two display choices are available.

With the first display choice, a user can choose to view a portion of the image. For instance, a user could view 61% of the pixel area from an XGA-size image on an SVGA-size display. To view the remainder of the pixels, the user would have to scroll the image both horizontally and vertically, causing some of the original pixels to scroll off screen. This method is generally objectionable. To read text, a user would have to shift the image back and forth as they read each line of text. And many graphics lose their impact if they can only be viewed piecemeal.

The second display choice is to downsample the image. Downsampling produces an image that fits a desired resolution by removing pixels from the original image. For instance, a 1024×768 XGA image can be downsampled to an 800×600 SVGA image by removing 224 of the image columns and 168 of the image rows. The advantage of this method is that the entire image can be viewed at once. But the disadvantage is that removing rows and columns of the original image throws away information.

Perhaps the simplest method of downsampling is to just delete rows and columns with a spacing determined by the downsample ratio. With such a method, the number of rows that need to be removed, and the spacing needed between them, are computed. A first row is deleted, and then rows separated from the first row by multiples of the deletion spacing are likewise deleted. The same algorithm then proceeds to remove columns in like fashion.

Although the deletion method produces acceptable results for low-detail imagery, it may render highly detailed imagery, particularly graphics, virtually unintelligible. Consider the case of downsampling the image row of FIG. 1 by a factor of two, by deleting the even-numbered rows, to produce the image row of FIG. 2 (with pixels shown twice as wide to match the width of FIG. 1). In the low-frequency portion of the original image row (columns 0–17), deletion preserved the overall shape of the intensity variation. In the medium-frequency portion (columns 18–38), deletion removed most of the intensity variation. And in the high frequency portion of the row (columns 39–44), the intensity variation was obliterated by deletion. The poor results on columns 18–44 are due to aliasing, i.e., artifacts resulting from sampling material containing spatial frequencies too high for the desired sample rate.

This aliasing effect can be observed on actual imagery. FIG. 5 shows a snapshot image of a computer-generated graphics window. FIG. 6 shows the same snapshot image after deletion downsampling by a factor of 0.781 (corresponding to an XGA to SVGA conversion). Much of the text in the image has been rendered unintelligible due to aliasing (for instance, the "1" has been dropped from the word "File" near the upper left hand corner, leaving the non-word "Fie" in its place.

Aliasing effects can be reduced in downsampled imagery by pre-filtering the image to reduce high-frequency content. The image row of FIG. 3 was produced by averaging pixels from FIG. 1 in pairs, and replacing both pixels with a single pixel containing their average. Note that this method kept some of the medium-spatial-frequency energy intact. But the high-frequency light-to-dark variations were merged into a single pulse.

On actual imagery, pre-filtering produces a blurred or "fuzzy" appearance around high-frequency areas such as text. FIG. 7 shows the image of FIG. 5 after downsampling by a factor of 0.781, using an interpolation filter. Although the content of the text can generally be made out, the text's blurriness strains the eyes.

SUMMARY OF THE INVENTION

Prior art downsampling methods were generally designed to work with adequately sampled images of natural scenes. Such images generally contain few areas of high-frequency information and are amenable to blurring-downsampling operations. Computer graphics, unlike natural scenes, may convey most of their information as high-frequency information. And unlike digitized images of natural scenes, downsampling of computer graphics can often be avoided by recreating the graphical image at a different resolution. But if a computer graphics image cannot be recreated at the new resolution for some reason (e.g., generating program not available, two output devices for the same image), downsampling must be employed. Prior art downsampling methods generally produce visually unacceptable results on computer-graphics and/or high-frequency-content images.

The present invention describes image downsampling with preservation of high-spatial-frequency information. Many images that contain graphics have both high-frequency and low-frequency regions, e.g., text and background. The high-frequency areas of graphics often contain redundant pixels—those with many neighboring pixels of the same intensity or color. The present invention seeks to maintain high-frequency regions by downsampling the image non-uniformly, with a preference for avoiding downsampling in high-frequency image regions. When a high-frequency region must be downsampled, the high-frequency region's redundant pixels are preferably removed. The non-uniform downsampling preserves high-spatial-frequency regions with minimal aliasing and without introducing blur.

In one aspect of the invention, a method of downsampling a digital image is disclosed. Expressed most succinctly, the method comprises selecting a deletion path through an image using a deletion path metric that favors a path through low relative spatial frequency areas of an image, and then deleting the pixels lying along the deletion path. If some pixels along a selected path have relatively high spatial frequency, that region of the image may optionally be low-pass filtered prior to pixel deletion.

Expressed in more detail, the method comprises the following steps. The method calculates spatial frequency for groups of adjacent pixels on the digital image. The method then uses spatial frequency to create scores for different potential deletion paths through the digital image. A deletion path having the most favorable score is selected from among the potential paths, and pixels along that path are deleted. Preferably, the method recurses until a desired downsampling is reached.

Several factors preferably contribute to a potential deletion path's score. First, the absence of high spatial frequency edges along and parallel to a path weighs heavily in favor of that path. The relative absence of high spatial frequency edge crossings orthogonal to the path also favors that path. Straight paths are also generally favored over crooked paths. And path proximity to a desired path location may also favor a path.

In another aspect of the invention, a system for downsampling a digital image is disclosed. The system comprises a spatial frequency estimator that accepts a digital image as input and computes spatial frequency estimates for groups of adjacent pixels on the digital image. It also comprises a path generator that generates potential pixel deletion paths through the image. A path scorer calculates path scores for potential pixel deletion paths based at least in part of spatial frequency estimates, and a pixel remover reduces the pixel dimensions of the digital image by selecting, from among the potential deletion paths, a deletion path having the most desirable deletion path metric and removing pixels lying along that path. The system may downsample without recursion, or it may delete a single path at a time and recurse. The system may downsample horizontally, vertically, or both horizontally and vertically.

BRIEF DESCRIPTION OF THE DRAWING

The invention may be best understood by reading the disclosure with reference to the drawing, wherein:

FIGS. 16a, 16b, 17a, 17b, 18a, 18b, 19a, 19b, 20a, 20b, 21a, 21b, 22a, 22b, 23a, and 23b show step-by-step deletion path selection according to an embodiment of the present invention, for the text region of FIG. 13a;

DETAILED DESCRIPTION OF THE PREFERRED EMBODIMENTS

Figure 1:
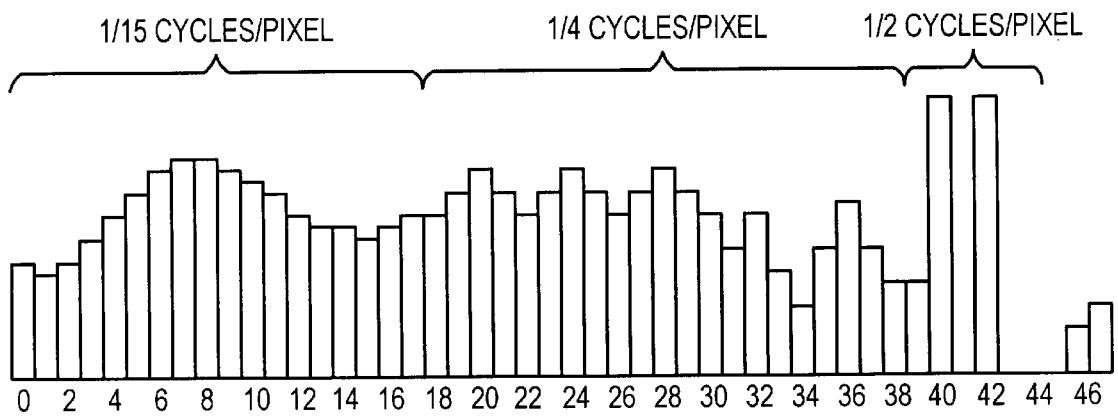
FIG. 1 contains a bar graph of pixel intensity values along a row of a hypothetical image.
Figure 2:
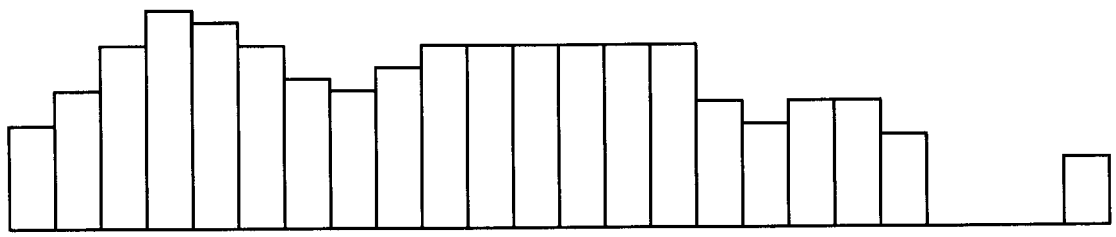
FIGS. 2 and 3 contain bar graphs of pixel intensity values for downsampling of the pixel intensity values of FIG. 1 according to two prior art methods.
Figure 3:
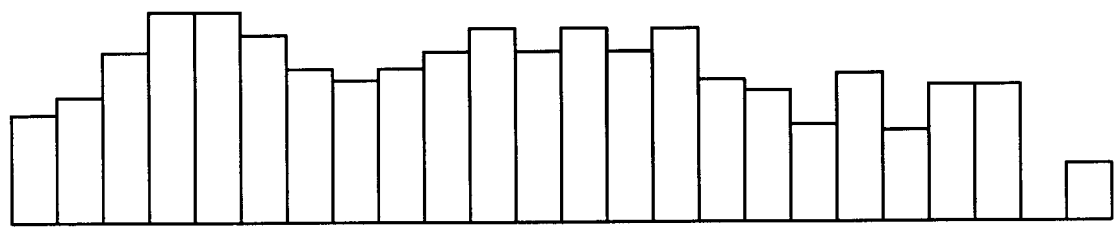
Figure 4:
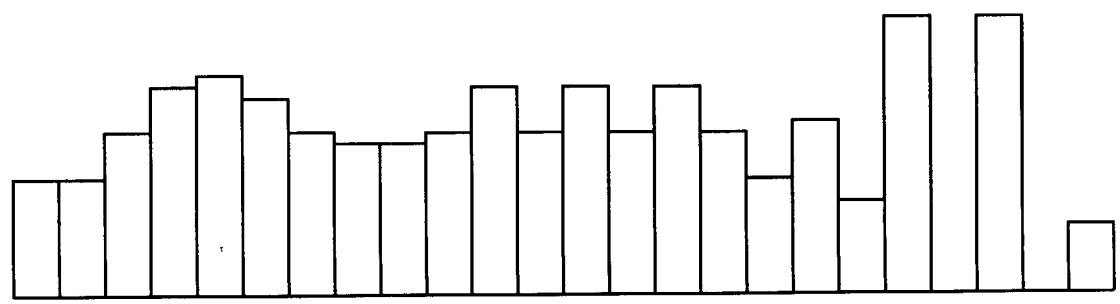
FIG. 4 contains a bar graph of pixel intensity values for downsampling of the pixel intensity values of FIG. 1 according to an embodiment of the present invention.
Figure 5:
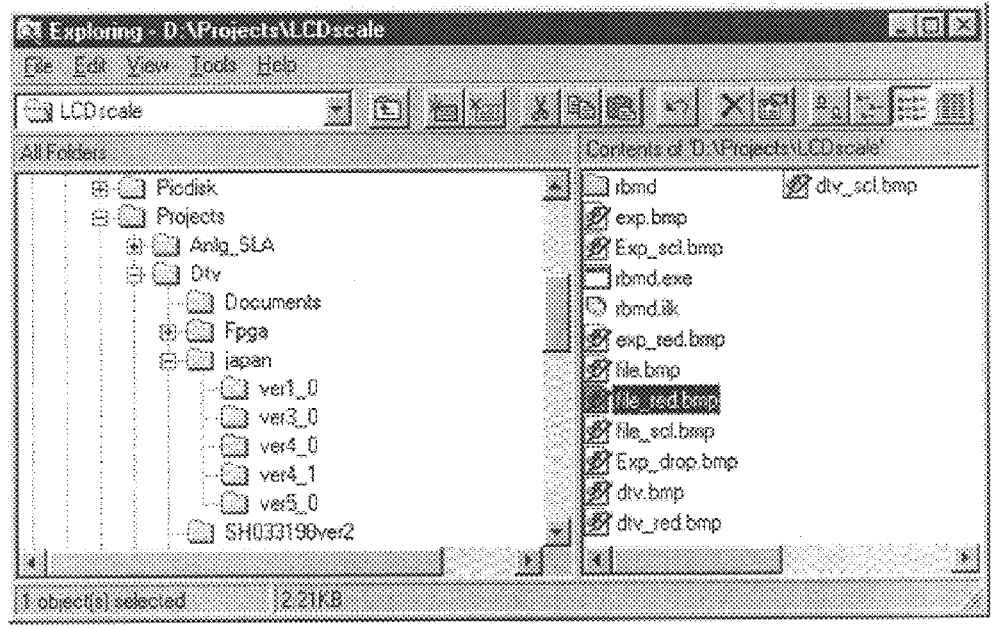
FIG. 5 shows an original computer graphics image.
Figure 6:
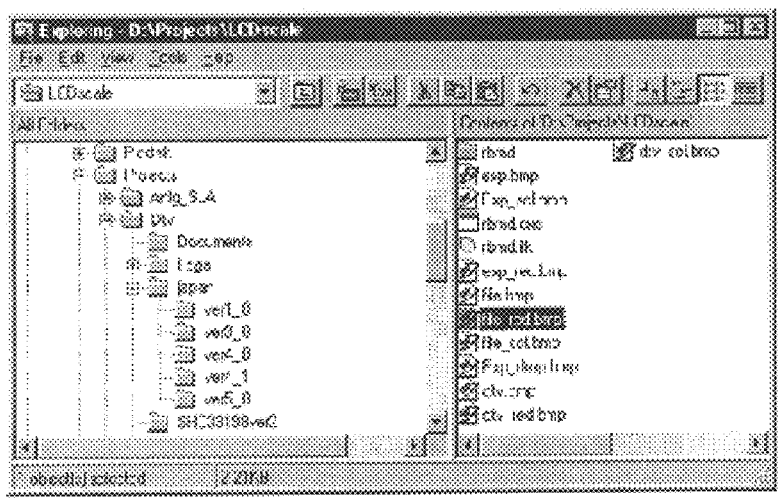
FIGS. 6 and 7 show downsampling results according to two prior art methods, for the original computer graphics image of FIG. 5.
Figure 7:
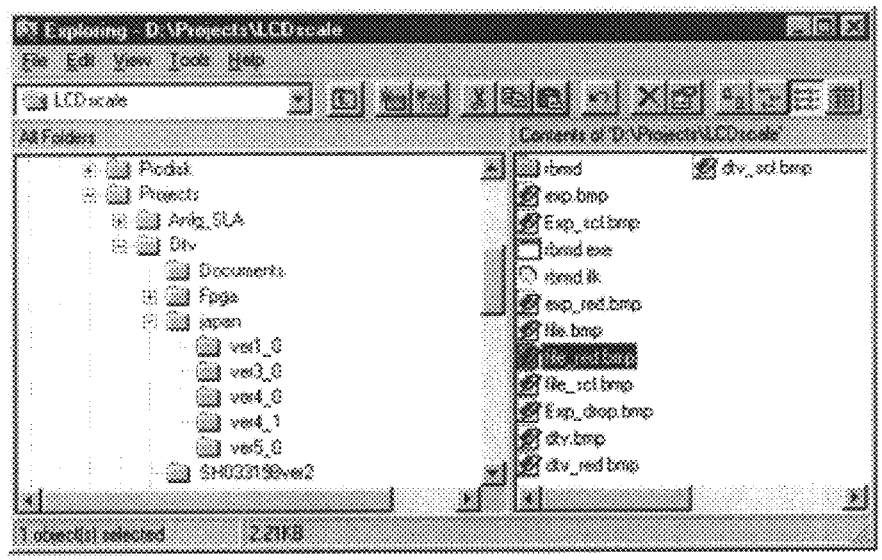
Figure 8:
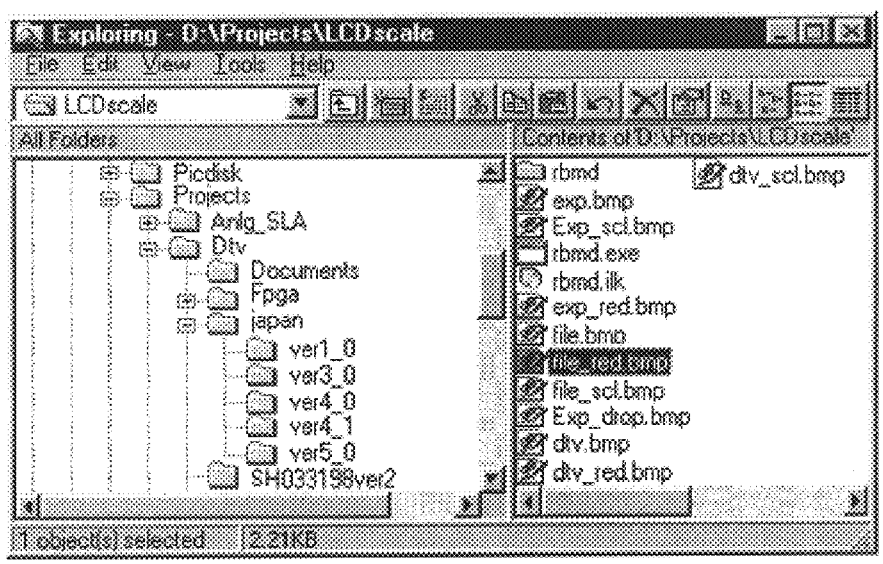
FIG. 8 shows downsampling results according to an embodiment of the present invention, for the original computer graphics image of FIG. 5.

The present invention may be appreciated on a basic level by referring again to the bar graph of pixel intensity values of FIG. 1. If this image is uniformly downsampled by a factor of two, columns 39–44 will be aliased or blurred beyond recognition, and columns 18–38 will be critically sampled at twice their highest spatial frequency. The present invention allows such problems to be avoided by resorting to a nonuniform downsampling scheme, resulting, for instance, in the bar graph of FIG. 4. Note particularly in FIG. 4 that downsampling has avoided removing pixels from original columns 39–43, where the highest spatial frequencies existed, choosing instead to remove nearby, lower spatial frequency pixels. This results in a scale distortion with respect to the original. But the high frequency information remains, with the only information loss perhaps existing in the aesthetics of the relative size of image objects.

Effects of Non-uniform Downsampling

Figure 9:
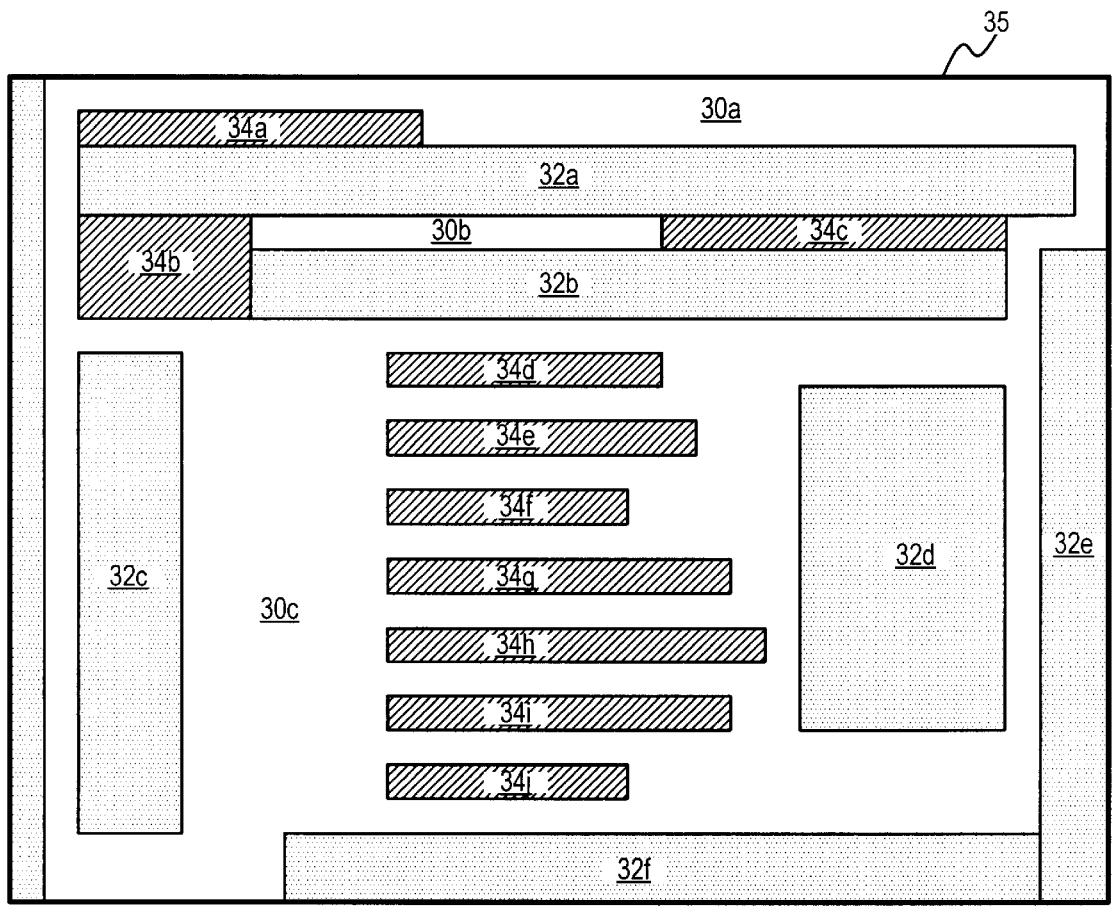
FIG. 9 illustrates one possible distribution of spatial frequency in a computer graphics image.

The effects of the present invention may perhaps be better understood by examining the original image map of FIG. 9. This image map illustrates a graphical image as a group of regions of similar spatial frequency. Background regions (e.g., 30a, b, and c) have almost no variation in intensity between adjacent pixels. Textured regions (e.g., 32a–f) have some variations between adjacent pixels, although these follow a regular dither pattern and are not meant to convey high-frequency information. High-frequency regions (e.g., 34a–j) generally consist of text and high-contrast graphics.

Figure 10:
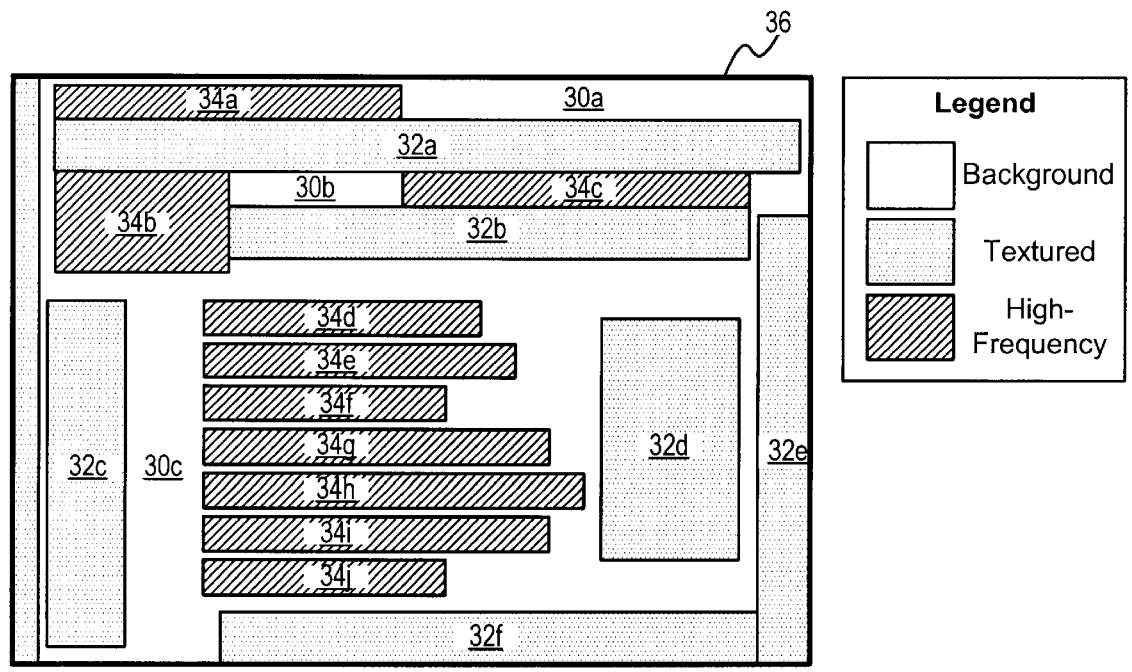
FIG. 10 illustrates downsampling effects on the image of FIG. 9, for a method according to the invention.

One possible spatial frequency map for a downsampled version of the image map of FIG. 9 is shown in FIG. 10. Note that although the overall image height and width have been reduced by 30%, high-frequency regions 34a–j have not decreased in size. Texture regions 32a–f have been reduced in size proportionally. But background regions 30a–c have changed shape disproportionately. The downsampling has, in effect, "rearranged" the spatial frequency objects on the image by resizing them differently.

Seeding and Tracing Candidate Deletion Paths

Figure 11:
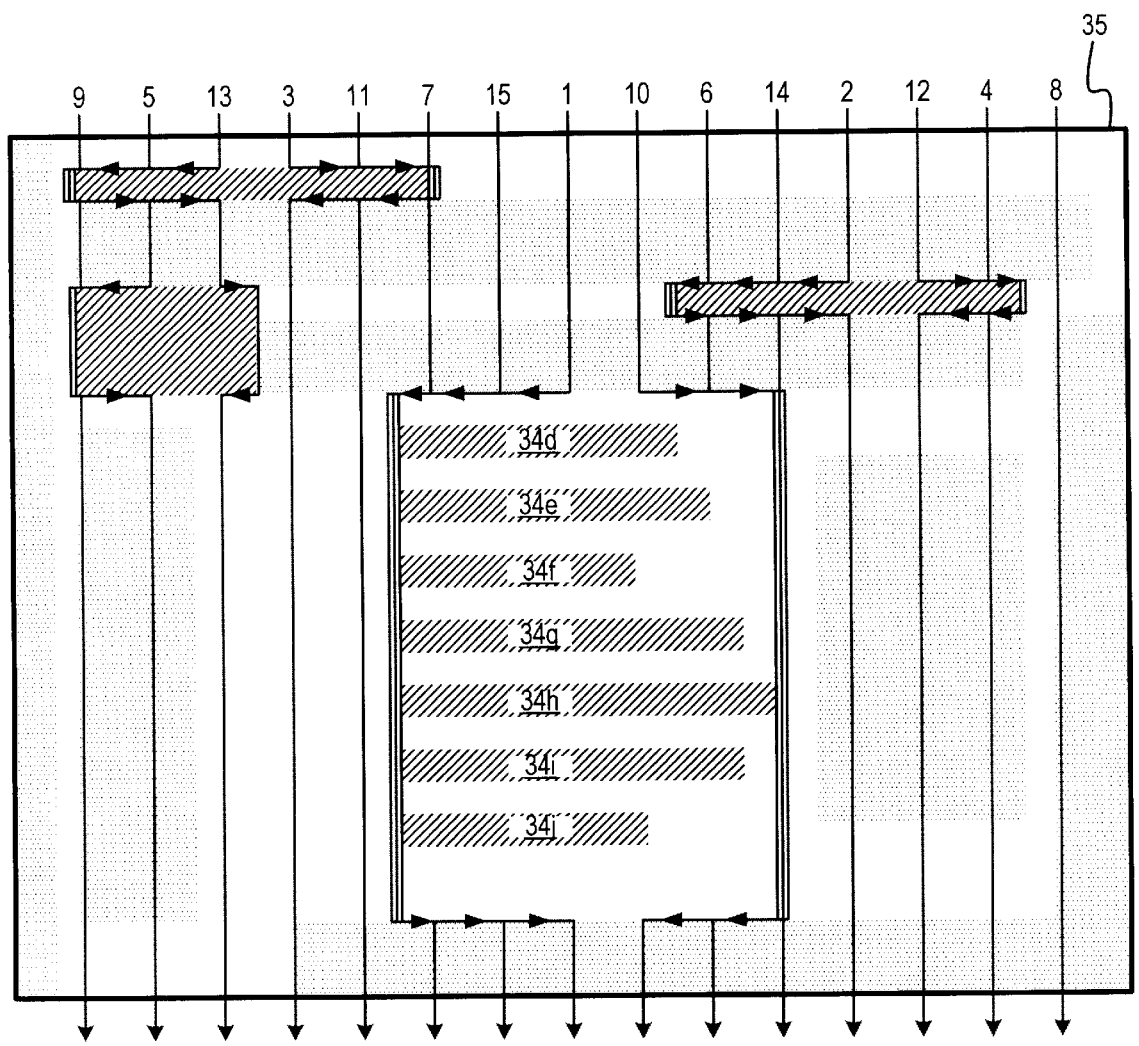
FIG. 11 shows selected deletion paths for the spatial frequency distribution of FIG. 9.

FIG. 11 illustrates graphically the operation of one embodiment of the invention, using a reproduction of spatial frequency map 35 of FIG. 9. Fifteen numbered paths are shown traversing map 35 from top to bottom. These paths are evenly spaced along the columns of the image. The paths preferably stay in their starting, or seed, columns as they pass through background and textured regions. But when a high-frequency region is encountered, the paths prefer to discover a way around, rather than through, the high-frequency region. Thus paths 7, 15, and 1 prefer to jog to the left through background, and paths 1, 10, and 6 prefer to jog to the right through background, rather than pass through regions 34d–j. Pixels deleted along these paths will begin the downsampling process resulting in map 36 of FIG. 10.

FIG. 11 also shows a preferred sequence for computing deletion paths. Instead of generating the paths sequentially across the image from one side to the other, the path generation sequence is determined using a distance metric. The distance metric prefers, as a starting location for each new path, a column that is located the maximum distance from the set of all previous starting columns and from a first virtual column α columns left of the input image's leftmost column and from a second virtual column α columns right of the input image's rightmost column. The number α is 1 for equal spacing between seed columns and between the leftmost path and the image's leftmost column and between the rightmost path and the image's rightmost column. The location of the next starting column $C_n$ can be expressed mathematically as the column that minimizes a function such as $$C_n = \min_{i=0\ \text{to}\ N-1} \left( \frac{1}{|i+\alpha|} + \frac{1}{|i-N+1+\alpha|} + \sum_{j=0}^{n-1} \frac{1}{|i-C_j|},\ i \ne C_j \right)$$

where the input image has N columns numbered 0 through N–1.

Thus the first starting column $C_0$ will be mid-image (corresponding to numbered path 1 in FIG. 11), and the second and third starting columns $C_1$ and $C_2$ will be at the quarter-image locations (corresponding to numbered paths 2 and 3 in FIG. 11). When two columns produce identical metrics, either may be selected as the next seed column.

This sequencing algorithm is preferred because it allows a nearby start column to traverse a relatively nearby area before the area is traversed by many distant start columns that could make the area un-traversable.

Figure 12A:
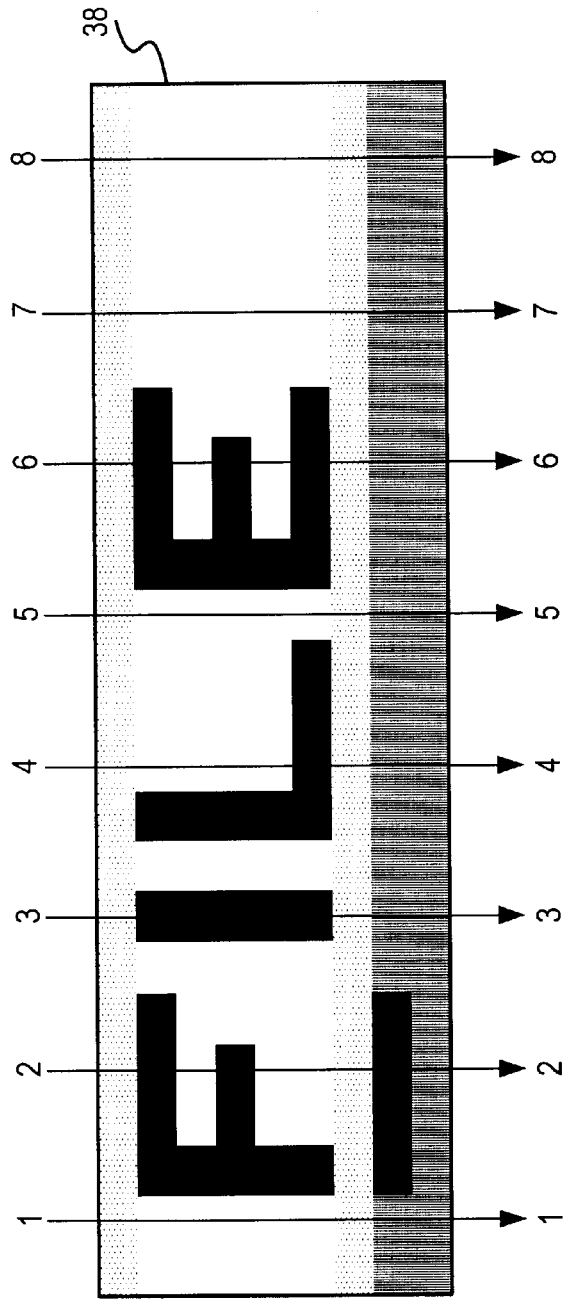
FIGS. 12a, 12b, and 12c show aliasing effects due to downsampling text with a prior art method.
Figure 12C:
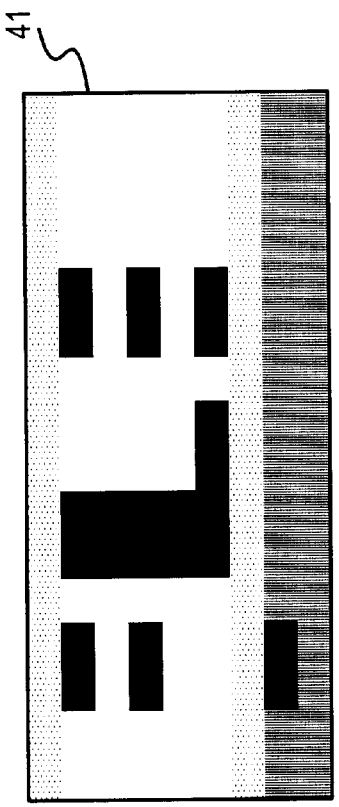
Figure 12B:
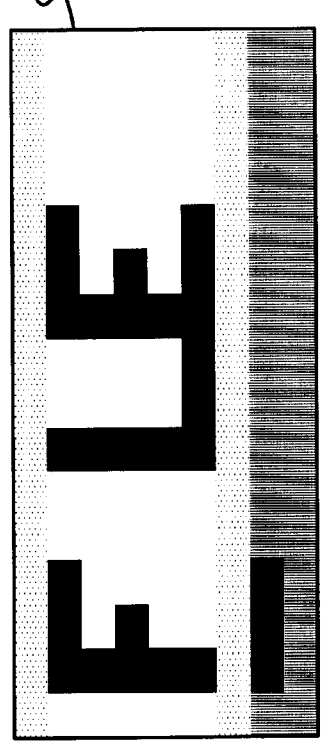

Operation of one embodiment of the invention will be explained with reference to the simple graphical image 38 of FIG. 12a, a 24×9 pixel image containing a bit-mapped representation of the word "FILE". FIG. 12a also shows, for reference, the columns 1–8 that would be removed by a prior art deletion algorithm if the image were to be reduced in width by one-third. FIG. 12b shows the downsampled image 40 produced by this prior art process. Although by fortuitous character spacing the characters "F", "L", and "E" were downsampled in a visually acceptable manner, the character "I" was completely removed from the image and the "L" and "E" were joined. Note that other possible start column selections that would save the "I" would produce even worse aliasing effects—FIG. 12c shows a downsampled image 41, where the deletion columns were shifted one column to the right from those of FIG. 12a.

Figure 13A:
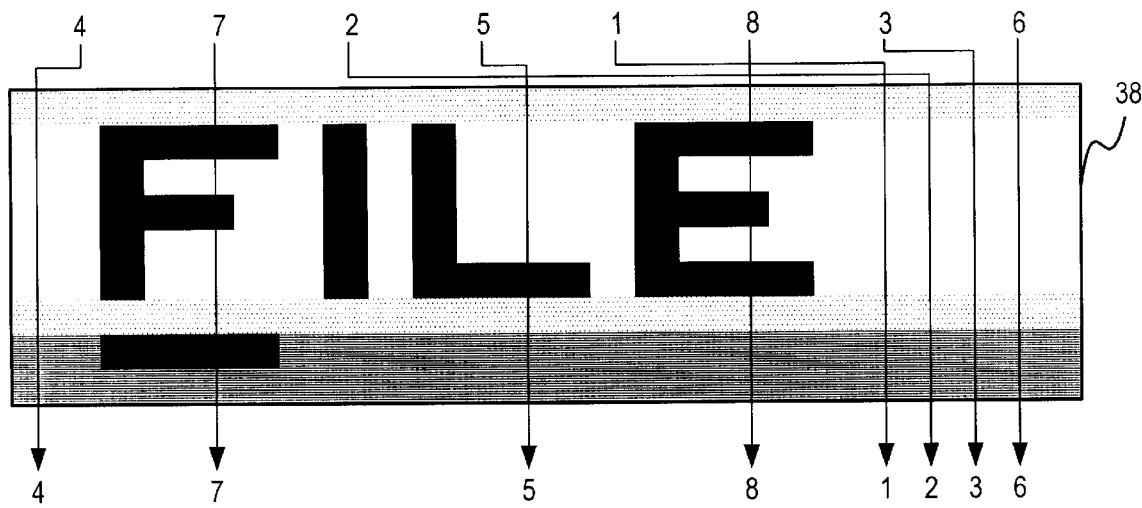
FIGS. 13a and 13b show downsampling the same text with a method according to an embodiment of the present invention.
Figure 13B:

FIG. 13a shows image 38 with deletion paths calculated according to an embodiment of the invention. These paths were seeded at the same locations as the prior art deletion column locations of FIG. 12a. But the present invention allows the paths to shift from these original locations in order to avoid high-frequency areas. Thus these paths tend towards the low-frequency areas of image 38, and in particular they avoid the particularly troublesome areas related to vertical portions of characters. FIG. 13b shows the downsampled image 42 produced by this process. Each character remains legible and spaced apart from its neighbors.

A Downsampling System

Figure 14A:
FIGS. 14a, 14b, and 14c show several steps in a downsampling method according to an embodiment of the present invention.
Figure 15:
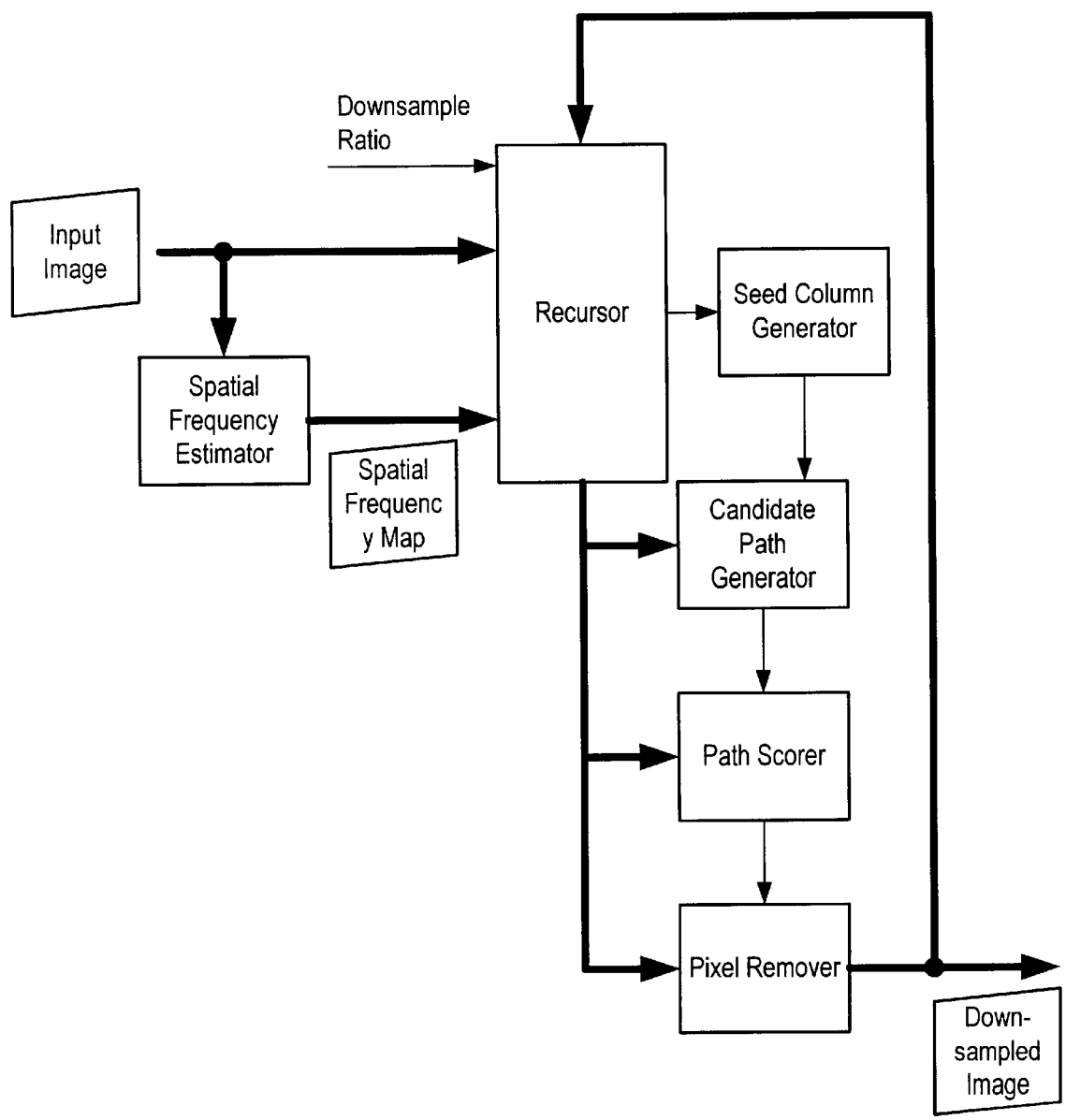
FIG. 15 shows an image downsampling system according to an embodiment of the present invention.

Step-by-step operation of an embodiment of the invention will now be illustrated using image 38, as redrawn in FIG. 14a. This embodiment uses four basic downsampling functional operations, as shown in FIG. 15: spatial frequency estimation; candidate path generation; candidate path scoring; and pixel removal. Preferably, at least the last three steps are performed recursively, i.e., a first deletion path is selected and removed before a second deletion path is processed. All functional blocks are preferably implemented on a programmable signal processor having access to input image data, intermediate image storage memory, and an image data output.

Spatial Frequency Estimation

The present invention relies on spatial frequency measurements to generate a non-uniform deletion path. In simplest form, the invention considers intensity differences between pairs of adjacent pixels on an M row by N column input image I(M,N). For instance, a vertical edge spatial frequency image V(M,N–1) may be calculated as ti $V(i,j)=|I(i,j)-I(i,j+1)|$, and a horizontal edge spatial frequency image H(M,N–1) may be calculated as $H(i,j)=|I(i,j)-I(i+1,j)|$.

If an input image contains color intensity represented as individual (e.g., red, green, blue) color components, each color will preferably be differenced separately and the results combined, e.g., $V(i,j)=|I_R(i,j)-I_R(i,j+1)|+|I_G(i,j)-I_G(i,j+1)|+|I_B(i,j)-I_B(i,j+1)|$ The image V(i,j) provides information that is useful in choosing columns of pixels for deletion. If V(i,j) at a particular coordinate i,j is small or zero, pixels I(i,j) and I(i,j+1) are identical or nearly so. On the other hand, if V(i,j) is large, significant high frequency information exists between the two pixels. And although pixel removal decisions may be based on a raw measurement of V(i,j), it is generally sufficient to threshold V(i,j) at a low value, e.g., 5 greyshades out of 256, and call everything above the threshold high frequency. Applying the V(i,j) operation and the 5 greyshade threshold to image 38 produces the classification depicted in FIG. 14b.

Figure 14B:
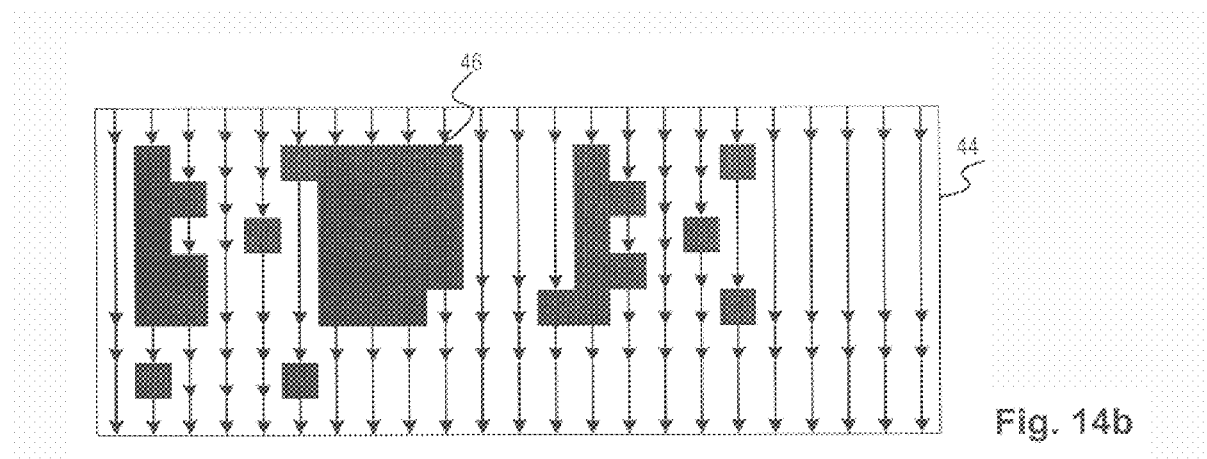

FIG. 14b illustrates vertical edge spatial frequency content for image 38 after thresholding. Threshold map 44 shows high frequency regions, such as region 46, shaded, and low-frequency regions unshaded. Map 44 also shows the location of horizontal edges in image 38 by arrowheads.

Image 38 may be segmented based on the information shown in map 44. Segmentation groups neighboring pixels with similar attributes. For purposes of the present invention, segmentation links neighboring pixels with similar intensity, i.e., those that fall below the spatial frequency threshold in both the vertical and horizontal directions.

Figure 14C:
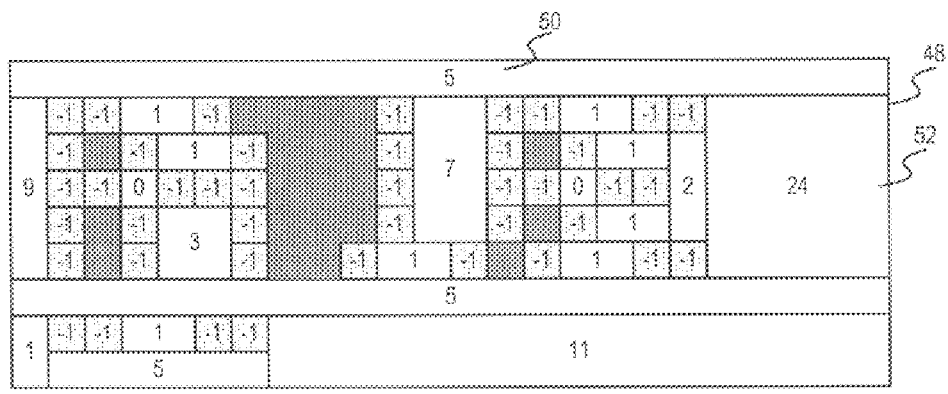

Segmentation in this particular embodiment groups pixels into rectangular blocks of low-frequency information, as shown in segmentation map 48 of FIG. 14c. Each unshaded rectangular block in map 48 contains only pixels with no high-frequency edges on either side. Such pixels are defined to be part of a triplet (three similar pixels in a row). The intermediate-shaded blocks of map 48 contain pixels that are either an end-pixel for a triplet, or part of a doublet (two similar pixels in a row). These pixels have low-frequency information on one side and high-frequency information on the other. Finally, the fully-shaded blocks of map 48 indicate pixels with high-frequency information on both sides.

Path Generation

Candidate path generation preferably generates multiple candidate paths each time a path must be selected for deletion. One of these paths starts on the next seed column obtained from the seed column sequence. Other paths start on columns near the seed column, with the total number of paths determined by a start path width parameter. For example, start paths can be initiated for a fixed number of columns, such as seven (three on each side of the seed column plus the seed column). Start path width can also depend on seed column spacing (e.g., the number of start paths can be set approximately equal to the seed column spacing, such that almost every column will be examined at some point for potential deletion). Or start path width may change dynamically, e.g., if a first width produces only poor candidate paths, the search may then be expanded to a second width.

Once starting columns for the candidate paths are determined, candidate path generation may be performed using segmentation map 48. A candidate path starts at a predetermined column in map 48, on the top row. The path transitions to subsequent rows in contiguous fashion, i.e., if the path's current location is I(i,j), it may transition only to pixel I(i+1,j−1), I(i+1,j), or I(i+1,j+1). The correct pixel for transition is determined by the following rules:

1. If the pixel below is part of a triplet block, the path transitions downward until the end of the block without shifting columns (although it may shift within the triplet block using rule 2a below if the path is not currently on the starting row).
2. Otherwise, the path transitions to the pixel directly below unless either:
    a. One of the diagonal pixels is closer to the path's starting column and is part of a triplet block (in which case the path transitions to that pixel), or
    b. The pixel directly below is not part of a doublet, but a diagonal pixel is (in which case the path transitions to that pixel). If both diagonal pixels belong to different doublets, transition to a diagonal pixel closer to the starting row is favored.

These rules favor two criteria, path straightness and deletion of redundant pixels. Deviations from path straightness only occur when either the current path will wipe out a high-frequency pixel, while an adjacent path will not, or the path is correcting itself back towards its beginning column through a triplet block. And redundant pixels are chosen for deletion whenever possible by favoring triplet and doublet pixels for removal.

Other rules are also possible. For example, the preferential return to the starting path row can be optionally disabled in favor of a straighter deletion path. The deletion path column boundaries can optionally be extended or contracted relative to the candidate starting column boundaries. The deletion path can optionally prefer to remain on pixels of a predetermined or calculated intensity, or can be allowed to move to non-adjacent pixels. The deletion path may also look-ahead and make decisions based on pixels ahead of the current row.

Path Scoring

Since the preferred embodiments compare multiple candidate paths, a comparison metric is used. This process is termed path scoring—characterizing a path's quality based on path attributes. Path attributes can be divided generally into two classes—those measuring the quality of the shape of the path itself, and those reflecting the spatial frequency content of the pixels in the deletion path.

Some path attributes are based on the shape of the path itself. For instance, an absolute path move penalty—one based on the distance from the seed column to the path's start column—can be exacted to express the desirability for proximity to the seed. Also, a relative path move penalty can be exacted each time the path changes columns.

Other path attributes are based on spatial frequency content of the pixels along the path. For instance, path scoring should prefer pixels having low spatial frequency content, measured perpendicular to the path. Path scoring can also reflect spatial frequency content in the same direction as the path—all else being equal, low spatial frequency content in both directions is preferred. This scoring value can be reflected in a color change penalty, i.e., one that exacts a penalty for each instance of color change along the path. It can also be reflected in a color continuity score that rewards extended triplet blocks of a common color. The advantage of the color continuity score, versus the color change penalty, is that it can be calculated independent of any specific path.

Each of these path attributes can be weighted so as to adjust their relative importance. In the illustrative embodiment below, the following weightings are used:

Absolute path move penalty: 1 unit/column of translation

Relative path move penalty: 1 unit/column of translation

Spatial frequency score: smaller of either a preset maximum (6 units, representing a spatial frequency of less than 0.0625 cycles/pixel) or the number of adjacent low frequency pixels−2.

Color change penalty: 1 unit/region

Color continuity score: 1 unit for each contiguous row of color continuity

The spatial frequency score, color change penalty, and color continuity score can be estimated independent of any specific path, thereby speeding computation of path scores. For instance, map 48 of FIG. 14c shows composite region scores for regions of the image. Region 50 has more than 8 adjacent low frequency pixels, and receives a maximum spatial frequency score of 6. It also has one row of color continuity, resulting in a color continuity score of 1. These two scores are multiplied for a triplet block, and then the 1 unit/region color change penalty is subtracted, for a total score of (6×1−1=5). Likewise, region 52 receives a composite region score of 24 after a similar computation (5×5−1).

Doublet pixels and high frequency pixels are not grouped. Each doublet pixel receives a spatial frequency score of 0, a color continuity score of 1, and a color change penalty of 1, for a total score of (0×1−1=−1). Each high frequency pixel receives a spatial frequency score of −1, a color continuity score of 1, and a color change penalty of 1, for a total score of (−1×1−1=−2).

An Example

Figure 16A:
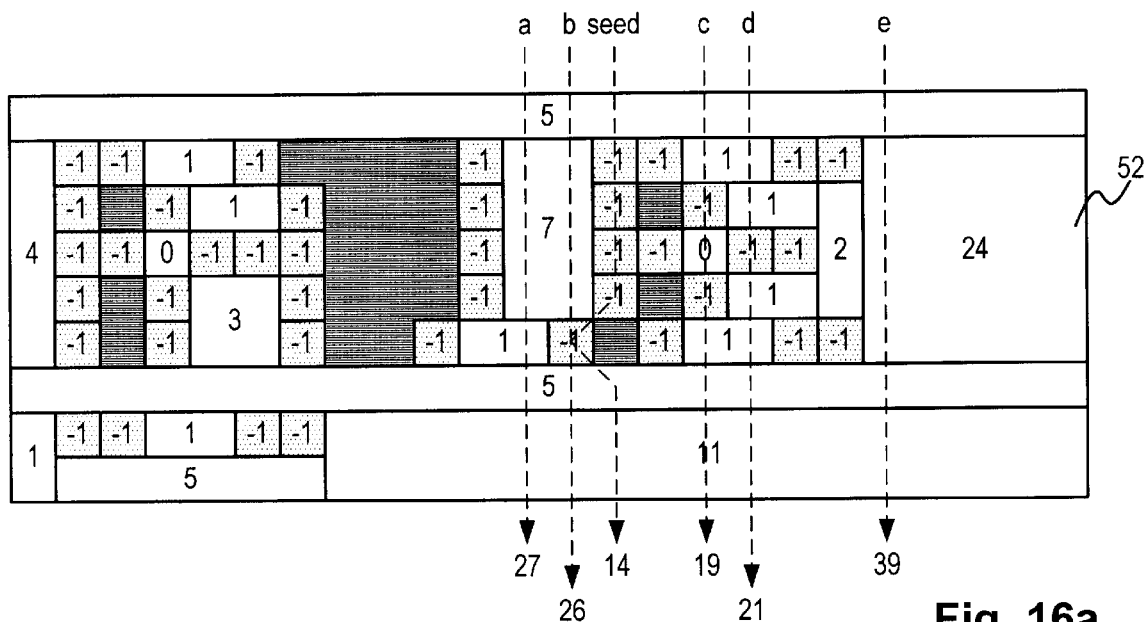
Figure 16B:
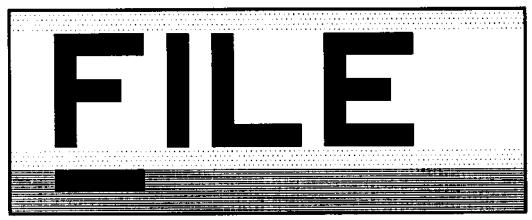

Beginning with FIGS. 16a and 16b, operation of the described embodiment will be shown for all eight deletion paths of FIG. 13a. The search path width is set in these examples large enough to let every column be considered as a possible start column. Enough paths are shown in this example to give an understanding of the invention, although not every considered path is shown in conjunction with this example.

Candidate paths in FIG. 16a are marked "seed" and with characters "a" through "e". Each path first receives an absolute path move penalty based on its proximity to the seed column, i.e., a penalty of 0 for the seed path, 1 for path b, 2 for paths a and c, 3 for d, and 6 for e. Each path is then traced top to bottom, accumulating region scores as it passes through the image. If a path transition rule causes the path to change columns (as the seed path does on the sixth and seventh rows to avoid the high-frequency pixel between the "L" and the "E"), a relative move penalty is asserted each column change. Thus the seed column, which lies just along the left side of the "E" in the original image, produces a path that uses 5 doublet and 4 triplet pixels. Its path score, shown at the bottom of the path, is a composite of its movement penalties (2 column shifts, for a penalty of −2) and the region scores (5−1−1−1−1+5+11), a total of 14.

In contrast, path "e", which lies two pixels to the right of the "E", is straight, uses only pixels from triplet blocks, and produces a path score of 39 despite its six-column deviation from the seed column. Thus path "e" produces the best path score, and its pixels would be marked for deletion.

After the path with the best score is identified, pixels along the path are deleted. The preferred deletion method is spatial-frequency dependent. If a pixel marked for deletion is a triplet pixel, it is simply deleted. If a pixel marked for deletion is part of a doublet, it may be either simply deleted, or averaged into its left and right neighbors and then deleted (note that one of its neighbors should be similar, such that averaging produces no appreciable change in that neighbor's intensity). Averaging prior to deletion is preferred for any high-frequency pixel marked for deletion. Averaging may, for example, use an interpolation that, in essence, forms a new pixel value by adding two-thirds of the neighbor pixel's intensity to one-third of the deletion pixel's intensity.

Figure 17A:
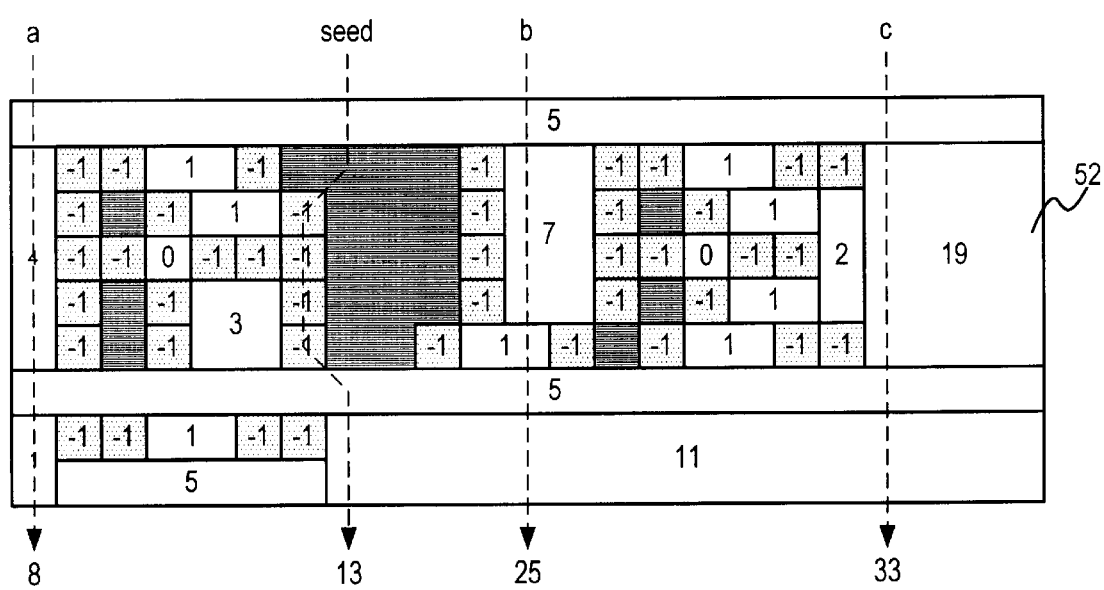

FIG. 16b shows the image after deletion of path "e". FIG. 17a shows an updated segmentation map after deletion of path "e". Note that region 52 has been reduced in size, and its region score is recomputed. Because this is still a triplet region after deletion of path "e", the deletion does not affect regions to the left of region 52.

Figure 17B:
Figure 18A:
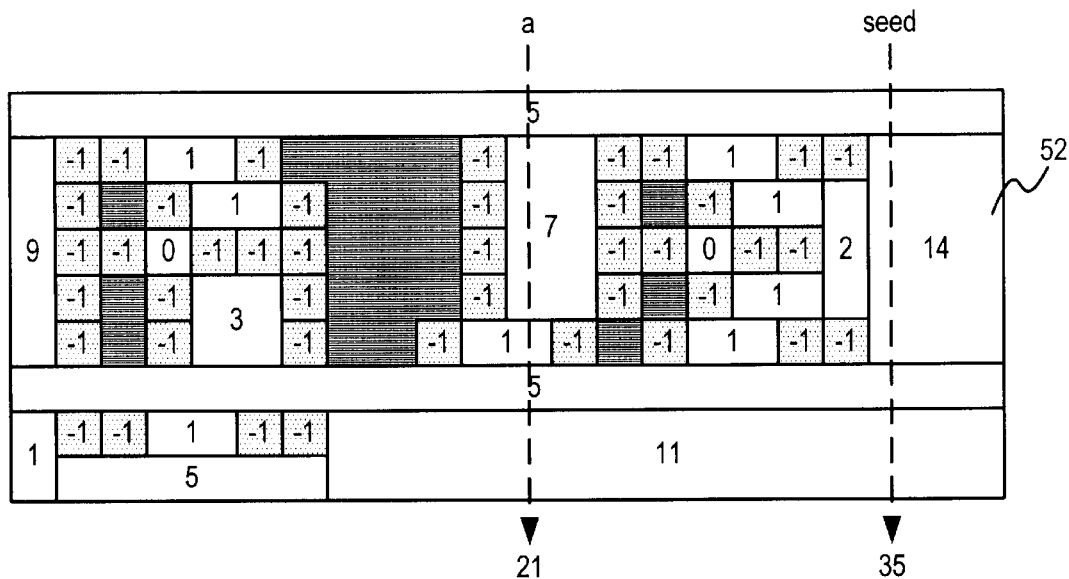

FIG. 17a shows four candidate paths for the second seed. The seed column is aligned with the "I" of the image, and is a particularly poor choice for column removal. The seed path traces the top pixel of the "I", then moves into the doublet space between the "F" and the "I". Path "b" traces through the horizontal stroke of the "L" and produces a much higher score. Path "c" through the background region produces the best score (note that with a smaller search path width path "c" may not have been examined), and is deleted to produce the image of FIG. 17b. FIG. 18a shows the updated region score for region 52.

Figure 18B:
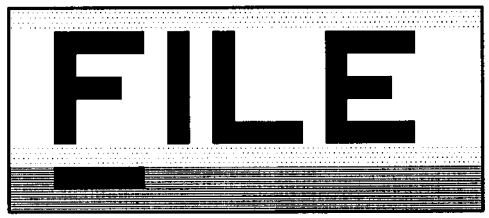
Figure 19A:
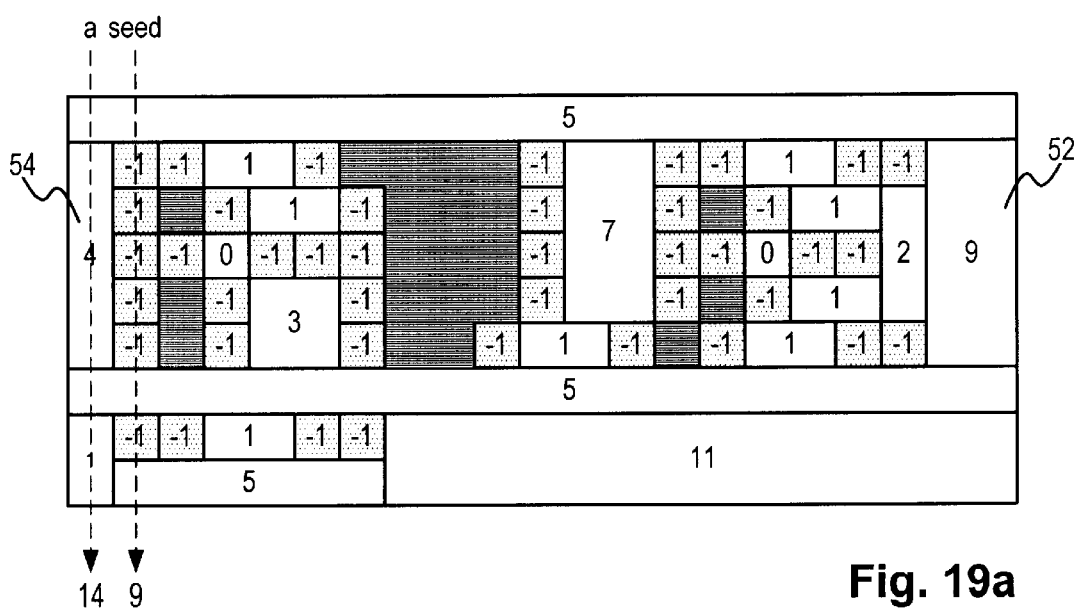

FIGS. 18a and 18b show the next seed column, which produces a good score and is followed. FIG. 19a shows the updated region score for region 52.

Figure 19B:
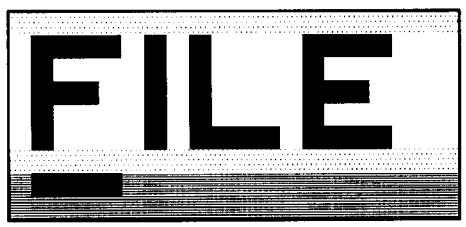

The seed column of FIG. 19a is just to the left of the "F". Although in the intensity image the seed column has identical values as column "a", path "a" produces a better metric because the seed path has high frequency pixels along one edge. FIG. 19b shows the image after deletion of path "a". Because deletion of path "a" destroys triplet block 54 of FIG. 19a, regions abutting block 54 must be updated in the segmentation map. The updated map contains a high-frequency region 56 along its left side.

The next seed is aligned with the vertical stroke of the "L" (FIG. 20a), which it avoids by moving to the right. The adjacent straight path "a", which deletes one pixel from the horizontal stroke of the "L", is preferred. FIG. 20b shows the image after deletion of path "a".

The seed column of FIG. 21a is once again aligned with background pixels, produces a good score, and is followed to produce the image of FIG. 21b.

Figure 22A:
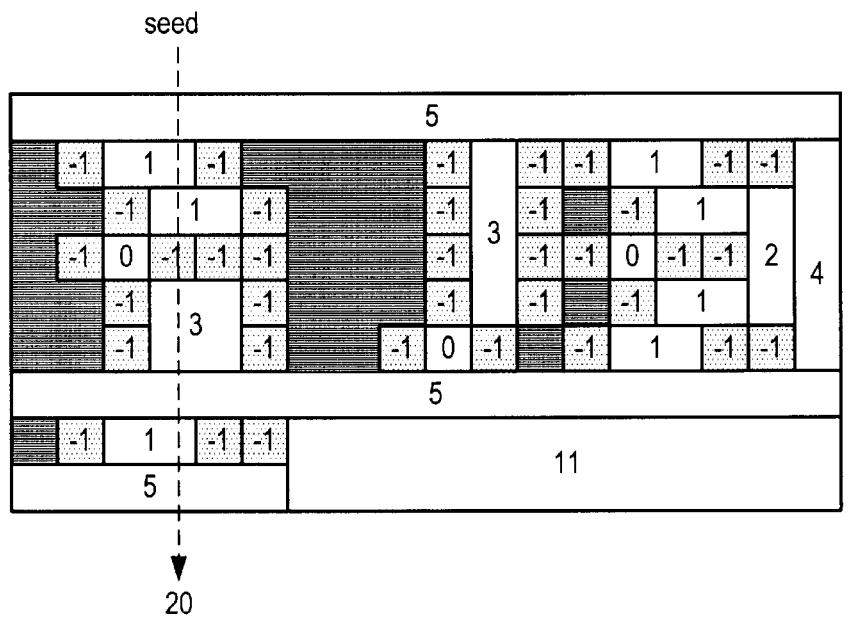
Figure 22B:
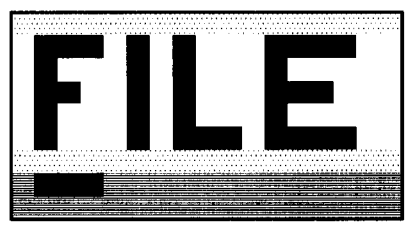

The seed column of FIG. 22a is aligned with the middle of the "F". It can be appreciated that shifts to the left or right produce an inferior deletion path, such that the seed column produces the best results. FIG. 22b shows the image after deletion of the seed column.

Figure 23A:
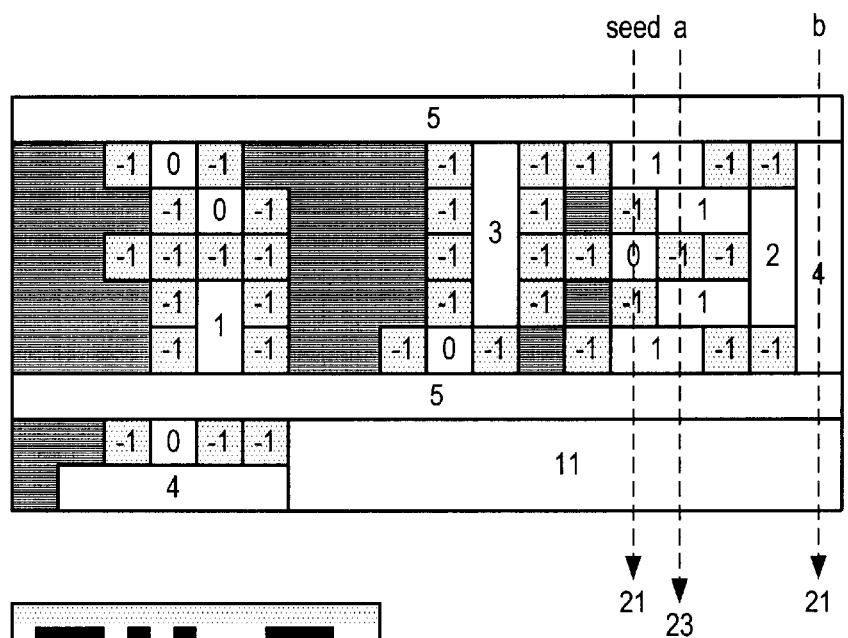
Figure 23B:
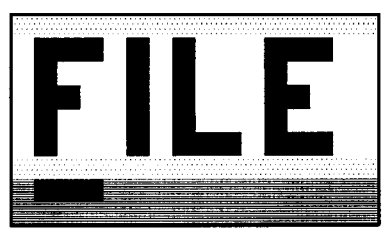

The last seed column is shown in FIG. 23a. The seed column and column "a" contain identical pixel values, but column "a" is selected for deletion because it is remote from more high-frequency edges than the seed column. FIG. 23b shows the image after deletion of all eight columns.

Alternative Embodiments

In a preferred embodiment, path straightness constraints may be relaxed for regions that are part of an extended contiguous background region. Paths preferably are only allowed to shift no more than one column per row of movement. But if the path can move through background only to and from a large background region, such a path may be preferred even though it may leave the initial search region with a single multiple-column shift. Adjacent background regions may be pre-linked prior to path generation.

Figure 24:
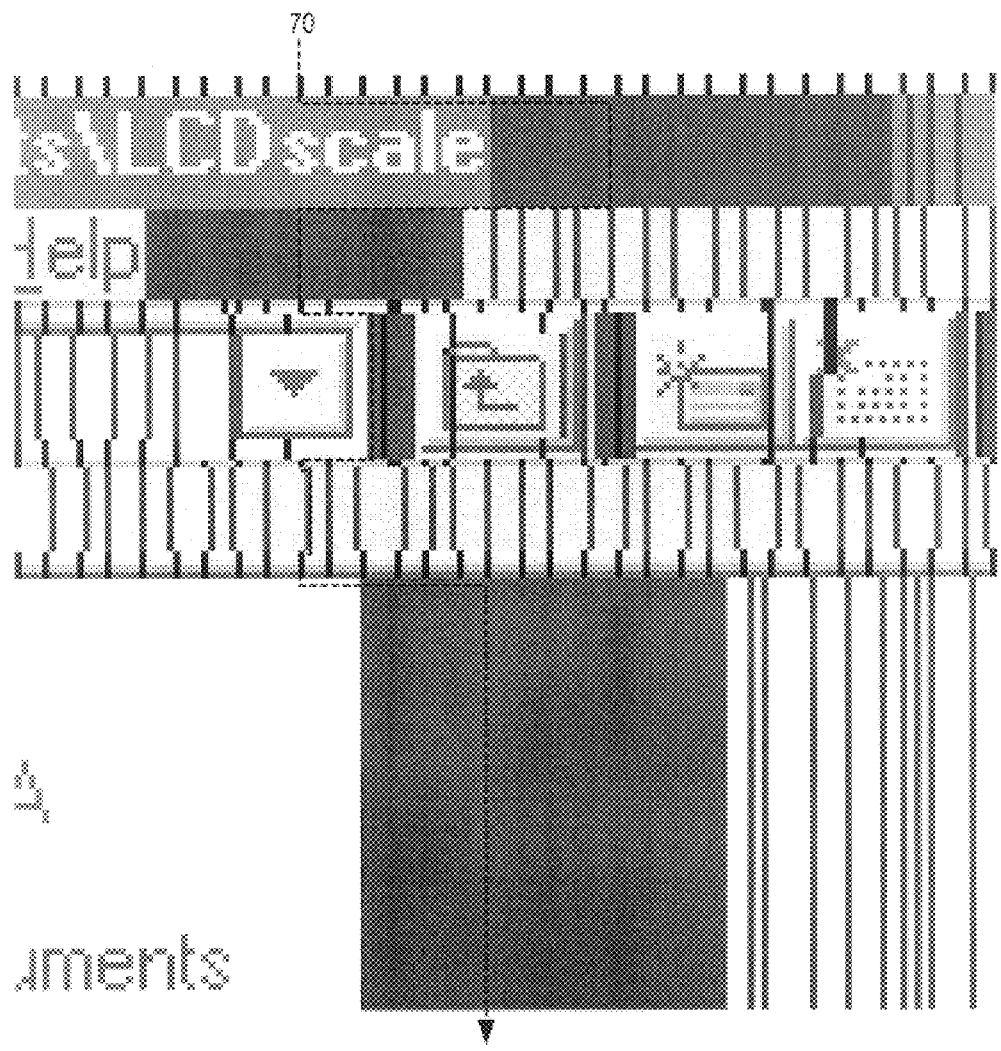
FIG. 24 shows results from an embodiment that favors background paths.

A background region may be defined as any triplet region that meets a minimum size criteria. If the current path can be connected to such a region without tracing a path that crosses any high-frequency edges, that path may be preferred to a local path that must cross a high-frequency edge. FIG. 24 shows an excerpt from an image, faded so that the dark superimposed deletion paths are visible. Path 70 shows three large jogs where path generation for one of the deletion paths followed background around high frequency regions.

Another modification to the invention is one that distinguishes texture from high-frequency information. Some computer graphics applications use two colors interspersed in a checkerboard pattern to simulate a third color. Although these appear as high-frequency edges, they are meant to be averaged or "mixed" by the eye into a single color. The invention preferably recognizes an extended checkerboard pattern as texture, and treats such a region similar to a background region. One method of doing this is to preprocess the image, replacing all checkerboard pixels with a common color that is the average of the two colors in the checkerboard. As an alternative, such regions may be recognized during path generation.

Generally, images are downsampled in both the column and row dimensions. A downsampling system according to the invention may run first on the columns and then on the rows, or vice-versa. A system that largely avoids duplication of code may be implemented by running the downsampler in one image direction, transposing the resulting image, running the downsampler again in that image direction, and transposing the resulting image again.

Figure 25A:
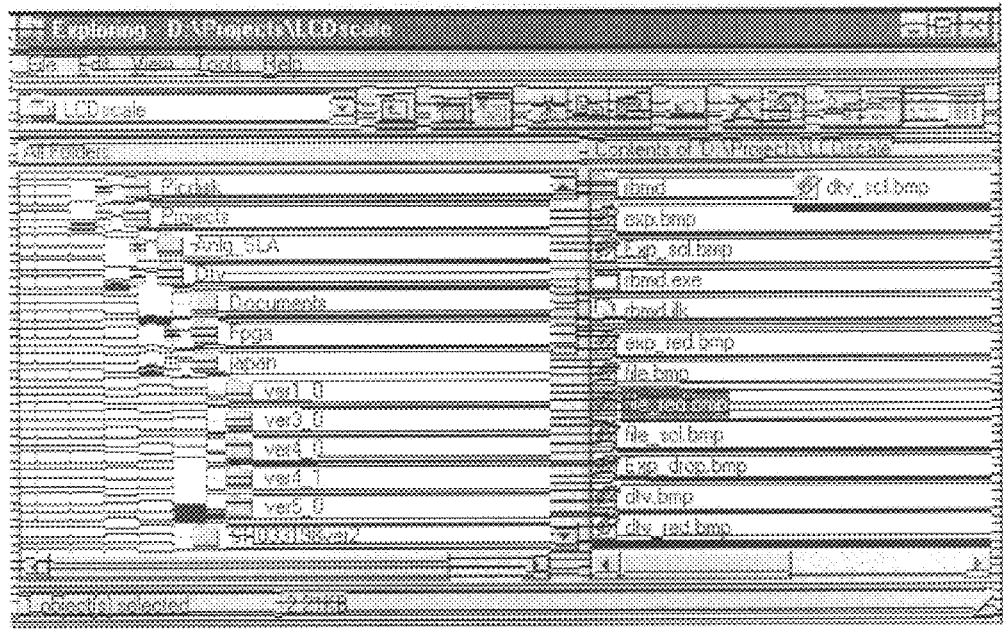
FIGS. 25a, 25b, 26a, and 26b show deletion paths selected for, and output results obtained with, an embodiment of the present invention for the computer graphics image of FIG. 5.
Figure 25B:
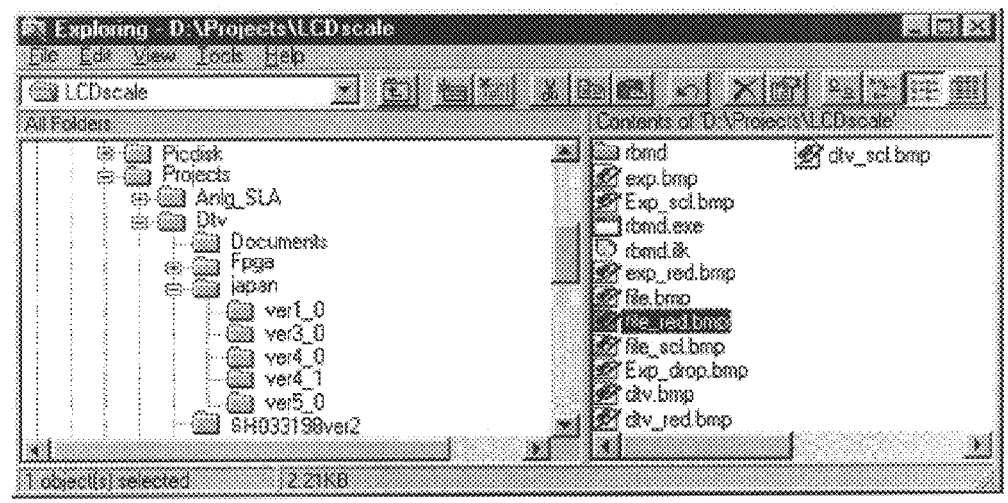
Figure 26A:
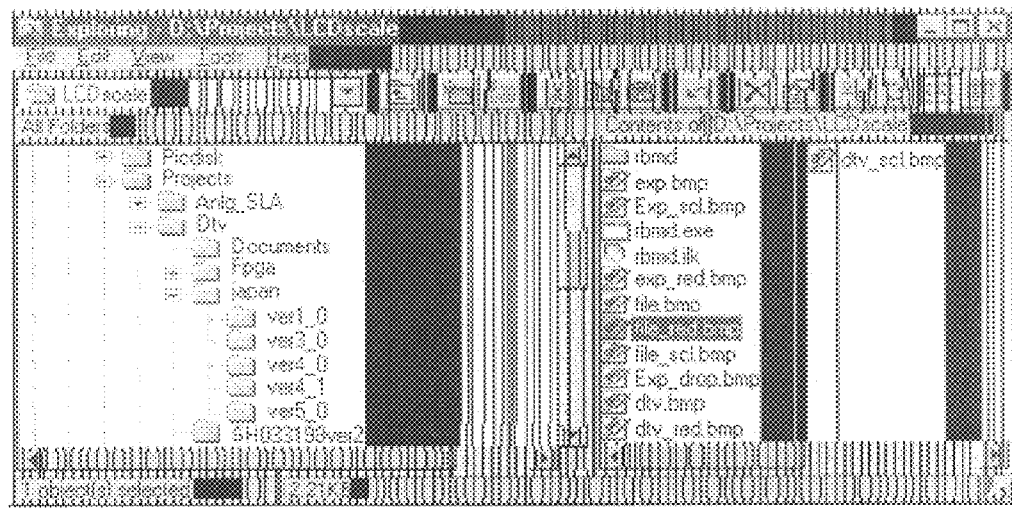
Figure 26B:
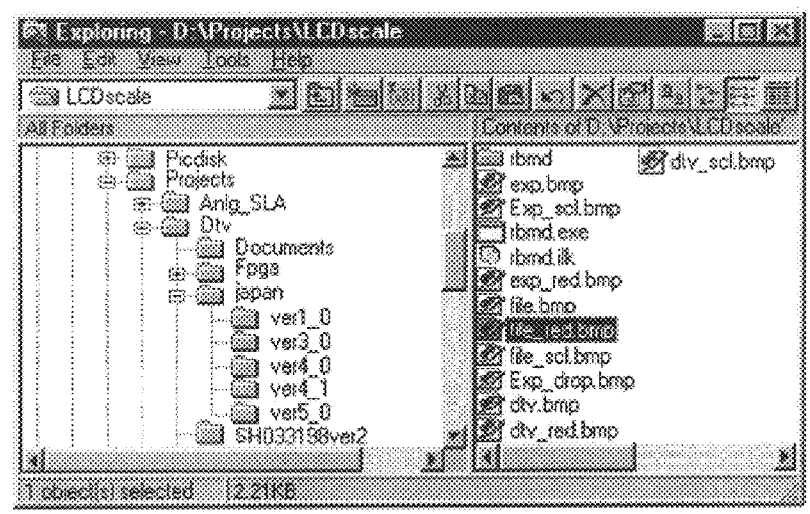

FIG. 25a shows an actual image with all selected row deletion paths superimposed. The image has been faded such that the deletion paths are clearly visible. FIG. 25b shows the intermediate image after pixels along these paths have been deleted (with averaging where applicable). FIG. 26a shows the intermediate image of FIG. 25b, faded with all selected column deletion paths superimposed. FIG. 26b shows the final downsampled image.

Individual implementations may be varied in many ways. Path scoring parameters and combination techniques may be tuned to individual preferences. The algorithm may use adaptive rather than fixed thresholds. For instance, the high-frequency versus low-frequency edge threshold may be based on image statistics. Alternately, multiple thresholds (or raw differences) may be used. Portions of paths may be pre-generated, e.g., by noting along with a triplet block other triplet blocks that it can transition to.

For background regions, distortion may be limited by including a metric that tracks the amount that a region has already been shrunk, and adds a penalty to a path that wishes to further distort a region that has already been shrunk a large amount.

After reading this disclosure, one of ordinary skill in the art will recognize that many other obvious and advantageous modifications to the disclosed embodiments are enabled by the concepts taught herein. For example, alternative spatial frequency measurement schemes, such as a Haar wavelet transform, may be used with the invention. The invention may also be made more rule-intensive, e.g., by using optical character recognition to locate characters and treat them differently during downsampling. Such modifications are intended to fall within the scope of the invention as claimed.

What is claimed is:

1. A method of non-uniformly downsampling a digital image, comprising the steps of:
   calculating spatial frequency for groups of adjacent pixels on the digital image;
   calculating a deletion path metric for each of at least two potential deletion paths through the digital image, each potential path preferring low-frequency pixels over neighboring higher-frequency pixels, the deletion path metric based at least in part on the results of the calculating spatial frequency step;
   selecting a deletion path, from among the potential deletion paths, having the most desirable deletion path metric; and
   deleting pixels along the deletion path.

2. The method of claim 1, further comprising the step of distributing path seeds approximately evenly along one edge of the digital image, with the number of path seeds set to achieve a desired downsampling ratio.

3. The method of claim 2, further comprising the steps of arranging the path seeds in a seed sequence, and selecting a deletion path corresponding to a given seed in the sequence before selecting a deletion path for later seeds in the sequence.

4. The method of claim 3, wherein said step of arranging the path seeds in a seed sequence comprises recursively selecting, as the next seed in the seed sequence, a path seed from among all previously unselected path seeds that is maximally distant from the image edges and all previously selected path seeds.

5. The method of claim 4, wherein the distance measure for determining maximal distance is the inverse of the pixel distance between the two points in the digital image.

6. The method of claim 2, further comprising the step of generating a set of two or more candidate deletion path start locations for each path seed.

7. The method of claim 2, wherein the deletion path metric favors a deletion path closer to the currently selected path seed.

8. The method of claim 1, wherein each deletion path metric penalizes its path for movements made perpendicular to the direction of the path.

9. The method of claim 1, further comprising the step of locating regions of extended checkerboard pattern in the digital image, and replacing these with a uniform color that is the average of the two checkerboard colors prior to downsampling.

10. The method of claim 1, wherein the step of deleting a pixel comprises averaging that pixel's intensity into the intensity of a least one neighbor pixel during the deleting step.

11. The method of claim 10, wherein the averaging step is performed only when the pixel marked for deletion and its neighbor differ significantly in intensity.

12. A method of downsampling a digital image, comprising the steps of:
   calculating spatial frequency for groups of adjacent pixels on the digital image;
   distributing path seeds approximately evenly along one edge of the digital image, with the number of path seeds set to achieve a desired downsampling ratio; and
   recursively selecting a previously unselected seed from among the path seeds, and for the currently selected seed,
      generating a set of two or more candidate deletion path start locations corresponding to that seed,
      traversing a candidate deletion path through the digital image for each start location in the set, with the candidate deletion path preferring low-frequency pixels over neighboring, higher-frequency pixels,
      calculating a deletion path metric for each candidate deletion path, the deletion path metric based at least in part on the results of the calculating spatial frequency step,
      selecting a deletion path, from among the candidate deletion paths, having the most desirable deletion path metric, and
      deleting pixels along the deletion path.

13. A non-uniform image downsampling system comprising:
   a spatial frequency estimator that accepts a digital image as input and computes spatial frequency estimates for groups of adjacent pixels on the digital image;
   a path generator that generates potential pixel deletion paths through the digital image, the path generator generating a path that prefers low-frequency pixels over neighboring higher-frequency pixels;
   a path scorer that calculates path scores for potential pixel deletion paths based at least in part on the spatial frequency estimates; and
   a pixel remover that reduces the pixel dimensions of the digital image by selecting, from among the potential deletion paths, a deletion path having the most desirable deletion path metric and removing pixels lying along that path to generate a downsampled digital image.

14. The image downsampling system of claim 13, further comprising a recursor that feeds the downsampled digital image obtained from the pixel remover back into the system until a desired number of deletion paths have been removed from the original digital image by the system.

15. The image downsampling system of claim 13, further comprising a seed location sequencer that selects a seed location in the digital image for the path generator.

* * * * *